United States Patent [19]

Ono et al.

[11] Patent Number: 5,015,671

[45] Date of Patent: May 14, 1991

[54] POWDER COATING COMPOSITION

[75] Inventors: Kazuya Ono, Tokyo; Tetsuo Miyake, Saitama; Katsuji Kitagawa, Kasukabe, all of Japan

[73] Assignee: Somar Corporation, Japan

[21] Appl. No.: 459,191

[22] Filed: Dec. 29, 1989

[30] Foreign Application Priority Data

Nov. 17, 1989 [JP] Japan .................. 1-299345

[51] Int. Cl.$^5$ .................. C08K 3/36; C08K 3/22
[52] U.S. Cl. .................. 523/402; 523/404; 523/414; 523/420; 523/457
[58] Field of Search ............. 523/404, 420, 414, 402, 523/457

[56] References Cited

U.S. PATENT DOCUMENTS

| | | | |
|---|---|---|---|
| 3,647,726 | 3/1972 | Ulmer | 260/18 |
| 4,223,097 | 9/1980 | Johannes et al. | 525/107 |
| 4,427,806 | 1/1984 | Zanvettor | 523/457 |
| 4,604,435 | 8/1986 | Koshii et al. | 525/476 |
| 4,668,718 | 5/1987 | Schreiber | 523/457 |
| 4,966,928 | 10/1990 | Kitagawa et al. | 523/437 |

FOREIGN PATENT DOCUMENTS

| | | |
|---|---|---|
| 60-186578 | 3/1984 | Japan . |
| 63-193970 | 8/1988 | Japan . |
| 63-221174 | 9/1988 | Japan . |

Primary Examiner—Lewis T. Jacobs
Attorney, Agent, or Firm—Lorusso & Loud

[57] ABSTRACT

A thermosetting, powder coating composition is disclosed which comprises an epoxy resin, a nitrogen-containing curing agent and an inorganic filler consisting essentially of aluminum hydroxide and silica, the weight ratio of the aluminum hydroxide to the silica being 1:4 to 4:1 and the filler being used in an amount of 40-300 parts by weight per 100 parts by weight of the epoxy resin.

7 Claims, No Drawings

POWDER COATING COMPOSITION

BACKGROUND OF THE INVENTION

This invention relates generally to a powder coating composition and, more specifically, to a thermosetting, epoxy resin-containing, powder coating composition suitable for forming an electrically insulating, tightly adhering coat on a metal surface.

The use of a thermosetting powder coating composition for the formation of an insulating layer on a metal surface is known. One such a known coating composition includes an epoxy resin and a curing agent such as an acid anhydride, a phenol novolak resin or dicyanodiamide. While the known coating composition shows good adhesiveness to ferrous metal surface, it fails to give a tightly adhering layer on a non-ferrous metal surface such as on a surface formed of copper or brass. Further, the known coating composition has a problem because electrical insulation of a cured coat obtained therefrom tends to be degraded during use. In particular, when the coated layer is subjected to repeated large temperature changes, to moistened conditions or to high electric voltages, the electrical insulation thereof becomes gradually poor.

SUMMARY OF THE INVENTION

It is, therefore, an object of the present invention to provide a thermosetting powder coating composition which is devoid of the drawbacks of the conventional coating composition.

It is a particular object of the present invention to provide a thermosetting powder coating composition capable of giving a tightly adhering coat over both ferrous and non-ferrous metal surfaces, which coat is stable and shows electrical insulating properties for a long period of use under severe conditions.

In accomplishing the foregoing objects, there is provided in accordance with the present invention an improved powder coating composition which includes an epoxy resin, a nitrogen-containing curing agent and an inorganic filler. The improvement involves the inorganic filler which consists essentially of aluminum hydroxide and silica and which is used in an amount of 40-300 parts by weight per 100 parts by weight of the epoxy resin, the weight ratio of the aluminum hydroxide to the silica being 1:4 to 4:1.

Other objects, features and advantages of the present invention will become apparent from the detailed description of the invention to follow.

DETAILED DESCRIPTION OF THE INVENTION

The epoxy resin to be used in the powder coating composition of the present invention is suitably a polyfunctional epoxy resin having two or more epoxy groups in its molecule. Examples of suitable epoxy resins include glycidyl ethers of bisphenol A, bisphenol F, bisphenol AD, brominated bisphenol A, glycerin, a polyalkylene oxide, a phenol novolak resin and ortho-cresol novolak resin; glycidyl esters of dimer acid and isophthalic acid; epoxidized polybutadiene obtained by reaction of polybutadiene with peracetic acid; heterocyclic epoxy resins; and mixtures thereof.

It is preferred that a solid epoxy resin be used in conjunction with a liquid epoxy resin having a weight per epoxy equivalent of 184-194 in such a mixing ratio that the resulting mixed epoxy resins have a softening point of 64°-28° C. and a weight per epoxy equivalent of 500-1100. The epoxy resin may be used together with an auxiliary component such as a butylal resin, a formal resin or a rubber with a functional terminal group for the purpose of improving impact strength and leveling property of a cured layer obtained from the coating composition. The auxiliary component may be generally used in an amount of 0.5-20 parts by weight, preferably 3-10 parts by weight per 100 parts by weight of the epoxy resin.

As a curing agent for the epoxy resin, a nitrogen-containing curing agent should be used. The nitrogen-containing curing agent is preferably one which has a skeletal structure of the formula:

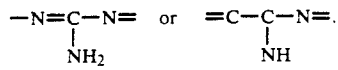

Illustrative of suitable curing agents are dicyanodiamide and its derivatives; a melamine and its derivative; guanamine compounds such as acetoguanamine and benzoguanamine; guanidine compounds such as o-tolylbiguanide, 2,6-dimethylphenylbiguanide and 2,4-dimethylphenylbiguanide; and dihydrazides of organic acids.

A nitrogen-containing curing promoter may be suitably used together with the curing agent. Triazine compounds, obtained by modifying cyanoethylated imidazoles with dicyanodiamide, and other modified imidazoles are preferably used as the curing promoter. The triazine compounds may include, for example, 2,4-diamino-6-[2-methylimidazolyl-(1)]-ethyl-S-triazine, 2,4-diamino-6-[2-ethyl-4-methylimidazolyl-(1)]-ethyl-S-triazine and 2,4-diamino-6-[2-undecylimidazolyl-(1)]-ethyl-S-triazine. The modified imidazole compounds may include, for example, trimellitic acid salts of cyanated imidazoles and isocyanuric adducts of imidazole compounds such as 2-phenylimidazole.

The curing agent is used in an amount so that the ratio of the equivalent of the functional groups of the curing agent to that of the epoxy groups of the epoxy resin is generally 0.3-2.0, preferably 0.3-1.5. The amount of the curing promoter is generally 0.1-5 parts by weight, preferably 0.3-3 parts by weight per 100 parts by weight of the epoxy resin.

It is important that the coating composition should contain a mixture of aluminum hydroxide and silica as an inorganic filler. The use of aluminum hydroxide and silica by themselves as a filler cannot attain the objects of the present invention. Other inorganic substances such as alumina, calcium carbonate and clay cannot produce the desired results, either. While the coating composition according to the present invention can contain a small amount of one or more of these substances in addition to aluminum hydroxide and silica, the additional use of such substances does not produce any additional merit.

Aluminum hydroxide obtained in the form of gibbsite by the Bayer process or hydrate of alpha-alumina may be suitably used as one of the components of the inorganic filler to be used in the present invention. Aluminum hydroxide generally has an average particle size of 0.5-60 μm, preferably 1-30 μm. For reasons of improving thermal resistance of a cured coat obtained from the powder coating composition, aluminum hydroxide particles desirably have as small an amount as possible of sodium impurities, such as less than 0.08% by weight.

Silica to be used as the other component of the inorganic filler may be, for example, synthetic silica and crystalline silica. For reasons of reduced thermal expansion and high thermal resistance and cracking resistance, the use of silica containing as small an amount as possible of impurities is preferred. For example, suitable silica is composed of more than 99% by weight of $SiO_2$, less than 0.5% by weight of $Al_2O_3$, less than 0.03% by weight of $Fe_2O_3$ and less than 0.3% by weight of CaO. Silica to be used in the present invention generally has an average particle size of 0.5–50 μm, preferably 2–20 μm.

The weight ratio of aluminum hydroxide to silica in the coating composition should be 2:8 to 8:2, preferably 3:7 to 7:3. A proportion of aluminum hydroxide below the abovespecified lower limit is disadvantageous because the resulting cured layer cannot withstand high voltage such as arc current. On the other hand, when the proportion of aluminum hydroxide exceeds the above-specified upper limit, the resulting cured layer becomes poor in weatherability. The mixed filler should be used in an amount of 40–300 parts by weight, preferably 50–150 parts by weight, per 100 parts by weight of the epoxy resin.

The coating composition may further contain various additives conventionally used in known coating compositions, such as a pigment and a leveling agent.

The coating composition may be prepared by any known method. For example, the epoxy resin and the filler is first mixed with each other by means of a kneader or an extruder at an elevated temperature sufficient to melt or soften the epoxy resin. The resulting mixture is cooled and ground to coarse particles. Then the curing agent, curing promoter and additives are mixed with the coarse particles first in a dry condition and then in a melted state. After cooling, the resulting mixture is finely ground to obtain the coating composition.

The powder coating composition according to the present invention can be suitably used for the coating of surfaces formed of ferrous metals and non-ferrous metals such as copper, brass and aluminum. Since the coat is excellent in adhesion, tensile strength, electrical insulation, thermal resistance and resistance to high voltage, the coating composition is advantageously used for application to electrical parts such as bus-bars and rectifiers.

The following examples will further illustrate the present invention. In Examples, "part" is by weight.

EXAMPLE 1

Powder coating compositions were prepared as shown in Table 1 below. The ingredients indicated in Table 1 are as follows:

Epoxy resin

A mixture of 20 parts of Epikote 1002 (weight per epoxy equivalent: 650), 60 parts of Epikote 1004 (weight per epoxy equivalent: 925) and 20 parts of Epikote 1007 (weight per epoxy equivalent: 1975), which are bisphenol A epoxy resins manufactured by Yuka-Shell Epoxy Inc.

Curing agent

A: Dicyanodiamide
B: 2,4-dimethylphenylbiguanide
C: o-Tolylbiguanide
D: Melamine compound (AMICURE AD-14, manufactured by Ajinomoto Inc.)
E: Phenol novolak resin (TAMANOL 754, manufactured by Arakawa Chemical Industry Co., Ltd.)

Curing promoter (I): 2,4-Diamino-6-[2-methylimidazolyl-(1)]-ethyl-S-triazine
(II): 2-Methylimidazole
(III): Triphenylphosphine

Filler $Al(OH)_3$: Aluminum hydroxide, average particle size: 3–30 μm, (HYDILITE H-32 manufactured by Showa Denko K. K.)
Silica: Average particle size: 6 μm (CRYSTALITE manufactured by Tatsumori Inc.)
Alumina: Average particle size: 12 μm
$CaCO_3$: Calcium carbonate, average particle size: 5–8 μm
Clay: Average particle size: 1.5 μm Each of the thus prepared coating compositions was tested for the gellation time thereof and the adhesiveness, tensile strength and stability (resistance to heat-cycle, to tracking and to arc) in insulation of the cured coat obtained therefrom. The test results are shown in Table 2. The test methods are as follows:

Gellation time

In accordance with a method specified in JIS C-2104, a sample powder coating composition is placed on a hot plate at 150° C. and the period of time required for the sample to gel is measured.

Adhesiveness

A sample composition is applied to a copper plate or a soft steel plate (50 mm × 20 mm × 1 mm) at 150° C. and the coat is then cured. After cooling to room temperature, the coated plate is bent to observe separation of the coat from the plate at the bent portion. Adhesiveness is rated as follows:
A: good (no separation)
B: fair (partly separated)
C: not good (mostly separated)
D: poor (completely separated)

Tensile strength

In accordance with a method specified in JIS K-6911, the tensile strength of a cured resin obtained from a sample coating composition is measured.

Resistance to heat-cycle

A sample composition is applied to five pieces of tough pitch copper plates (C-1100P, 80 mm × 80 mm × 3 mm) and cured to form a cured coat having a thickness of 0.2–0.5 mm on each plate. Each of the coated plates is maintained at 150° C. for 1 hour, then immersed in water for 0.5 hours, and subsequently maintained at −75° C. for 10 minutes. This heat cycle test involving the heating and cooling is repeated 100 times. The numbers of the coated plates in which cracks are formed after 10, 50 and 100 times of the heat cycle tests are counted.

Resistance to tracking

Meant by the term "resistance to tracking" is an ability of an insulating layer to withstand electrical current. The test method is as specified in ASTM D3638-77. A sample coating composition is processed to form a cured resin disc with a diameter of 70 mm and a thickness of 5 mm. A pair of electrodes are disposed with a distance therebetween of 4 mm. While impressing an electric voltage of 380 V between the two electrodes, a 0.1% aqueous ammonium chloride solution is dropped at intervals of 30 second to measure an electrical current flowing therebetween. The number of drops of the solution is counted until either an electrical current of 1 ampere flows for 0.5 second or an electrical current of 0.5 ampere flows for 1 second. Resistance to tracking is rated as follows:

A: good (number of drops: over 101)
B: fair (number of drops: 11-100)
C poor (number of drops: 1-10)

Resistance to arc

In accordance with a method specified in JIS K-6911/1962, a cured coat obtained from a sample coating composition is subjected to arc current while measuring the period of time (second) through which the coat withstands the arc current.

ple No. 13-19). The coating compositions were tested in the same manner as that in Example 1 to give the results summarized in Table 3.

TABLE 3

| | Sample No. | | | | | | |
|---|---|---|---|---|---|---|---|
| | 13 | 14 | 15 | 16 | 17 | 18* | 19* |
| Al(OH)$_3$ (weight %) | 20 | 40 | 50 | 60 | 80 | 0 | 100 |
| Silica (weight %) | 80 | 60 | 50 | 40 | 20 | 100 | 0 |
| Adhesion | A | A | A | A | A | A | A |
| Copper plate Resistance to heat-cycle 100 cycles | 1 | 0 | 0 | 0 | 1 | 3 | 5 |
| Resistance to tracking | B | A | A | A | A | B | A |
| Resistance to arc (sec) | 200 | 260 | 280 | 270 | 250 | 180 | 270 |

*Comparative sample

EXAMPLE 3

A coating composition was prepared in the same

TABLE 1

| | Sample No. | | | | | | | | | | | |
|---|---|---|---|---|---|---|---|---|---|---|---|---|
| | 1 | 2 | 3 | 4 | 5 | 6 | 7* | 8* | 9* | 10* | 11* | 12* |
| Ingredients (part) | | | | | | | | | | | | |
| Epoxy resin | 100 | 100 | 100 | 100 | 100 | 100 | 100 | 100 | 100 | 100 | 100 | 100 |
| Curing agent A | 3.0 | | | 6.0 | 6.0 | | | | | 3.0 | 3.0 | 3.0 |
| Curing agent B | | 3.0 | | | | | | | | | | |
| Curing agent C | | | 3.0 | | | | | | | | | |
| Curing agent D | | | | | | 8.0 | | | | | | |
| Curing agent E | | | | | | | | 11 | | | | |
| Curing agent F | | | | | | | | | 14 | | | |
| Promoter I | 0.8 | 0.8 | 0.8 | 1.0 | 1.0 | | | | | 0.8 | 0.8 | 0.8 |
| Promoter II | | | | | 0.3 | 0.8 | 0.8 | | | | | |
| Promoter III | | | | | | | | 1.0 | 0.5 | | | |
| Al(OH)$_3$ | 70 | 70 | 70 | 70 | 70 | 70 | 70 | 70 | 70 | | | |
| Silica | 60 | 60 | 60 | 60 | 60 | 60 | 60 | 60 | 60 | | | |
| Alumina | | | | | | | | | | 130 | | |
| CaCO$_3$ | | | | | | | | | | | 130 | |
| Clay | | | | | | | | | | | | 130 |

*Comparative sample

TABLE 2

| | Sample No. | | | | | | | | | | | |
|---|---|---|---|---|---|---|---|---|---|---|---|---|
| | 1 | 2 | 3 | 4 | 5 | 6 | 7* | 8* | 9* | 10* | 11* | 12* |
| Gellation time (sec) | 25 | 30 | 27 | 20 | 18 | 22 | 20 | 25 | 18 | 24 | 26 | 24 |
| Adhesion | | | | | | | | | | | | |
| Copper plate | A | A | A | A | A | A | A | B | A | A | B | A |
| Soft steel plate | A | A | A | A | A | A | A | A | A | A | B | A |
| Tensile strength (kg/cm$^2$) | 7.0 | 6.5 | 6.4 | 6.5 | 6.2 | 6.5 | 5.5 | 6.2 | 6.7 | 6.7 | 6.1 | 6.0 |
| Resistance to heat-cycle | | | | | | | | | | | | |
| 10 cycles | 0 | 0 | 0 | 0 | 0 | 0 | 0 | 1 | 1 | 0 | 5 | 4 |
| 50 cycles | 0 | 0 | 0 | 0 | 0 | 0 | 1 | 3 | 1 | 0 | — | 5 |
| 100 cycles | 0 | 0 | 0 | 2 | 2 | 0 | 3 | 3 | 1 | 1 | — | — |
| Resistance to tracking | A | A | A | A | A | A | B | C | B | B | C | C |
| Resistance to arc (sec) | 280 | 260 | 260 | 270 | 270 | 220 | 180 | 150 | 230 | 150 | 90 | 130 |

*Comparative sample

EXAMPLE 2

To 100 parts of a mixture of 40 parts of Epikote 1001 (weight per epoxy equivalent: 475), 50 parts of Epikote 1007 (weight per epoxy equivalent: 1975) and 10 parts of Epikote 828 (weight per epoxy equivalent: 190), which are bisphenol A epoxy resins manufactured by Yuka-Shell Epoxy Inc., 4 parts of dicyanodiamide, 0.8 part of curing promoter I used in Example 1 and 130 parts of a mixed inorganic filler consisting of Al(OH)$_3$ and silica with various blending ratios as shown in Table 3 were mixed to form coating compositions (sammanner as that of Example 2 except that a mixture of 70 parts of Al(OH)$_3$ and 60 parts of silica was used as an inorganic filler and that the following components were additionally incorporated into the coating composition in amounts shown below per 100 parts of the epoxy resin.

Butylal resin: 20 parts
Acrylic ester: 0.3 part
Titanium oxide: 5 parts
Carbon black: 0.06 part The coating composition was tested in the same manner as that in Example 1 to give the results shown below:

| | |
|---|---|
| Gellation time (sec): | 25 |
| Adhesion | |
| Copper plate: | A |
| Soft steel plate: | A |
| Tensile strength (kg/cm$^2$): | 7.0 |
| Resistance to heat-cycle | |
| 10 cycles: | 0 |
| 50 cycles: | 0 |
| 100 cycles: | 0 |
| Resistance to tracking: | A |
| Resistance to arc (sec): | 280 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A powder coating composition comprising an epoxy resin, a nitrogen-containing curing agent and an inorganic filler consisting essentially of aluminum hydroxide and silica, the weight ratio of the aluminum hydroxide to the silica being 1:4 to 4:1 and said filler being used in an amount of 40-300 parts by weight per 100 parts by weight of said epoxy resin.

2. A powder coating composition according to claim 1, wherein said epoxy resin is a mixture of a liquid epoxy resin and a solid epoxy resin and has a weight per epoxy equivalent of 500-1100 and a softening point of 64°-128° C.

3. A powder coating composition according to claim 1, wherein said curing agent has a skeletal structure of the formula:

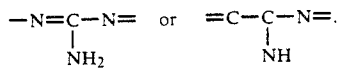

4. A powder coating composition according to claim 1, wherein the weight ratio of the aluminum hydroxide to the silica is 3:7 to 7:3.

5. A powder coating composition according to claim 1, wherein the aluminum hydroxide and the silica have average particle sizes of 0.5-60 μm and 0.5-50 μm, respectively.

6. A powder coating composition according to claim 1, wherein the aluminum hydroxide and the silica have average particle sizes of 1-30 μm and 2-20 μm, respectively.

7. A powder coating composition according to claim 1, wherein said filler is used in an amount of 50-150 parts by weight per 100 parts by weight of said epoxy resin.

* * * * *